Jan. 13, 1959
S. GRAY
2,869,010
INTERFERENCE TYPE OPTICAL FILTERS
UTILIZING CALCIUM FLUORIDE
Filed April 28, 1955
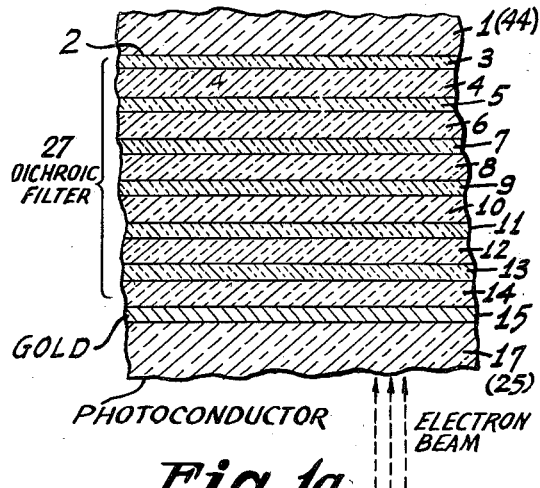
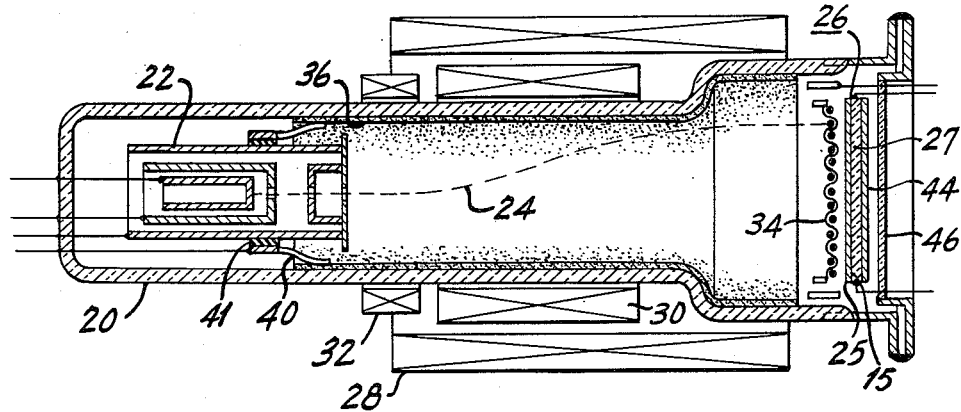
INVENTOR.
SIDNEY GRAY
BY J. L. Whittaker
ATTORNEY

2,869,010

INTERFERENCE TYPE OPTICAL FILTERS UTILIZING CALCIUM FLUORIDE

Sidney Gray, Somerville, N. J., assignor to Radio Corporation of America, a corporation of Delaware Application April 28, 1955, Serial No. 504,502

10 Claims. (Cl. 313—65)

This invention relates to improved optical devices. More particularly it relates to improved light filters of the interference type and to improved photosensitive devices incorporating such filters.

Interference filters composed of superimposed strata of dielectric materials are commonly known as dichroic filters. Generally, such filters are characterized by a relatively high degree of efficiency, i. e., substantially all the visible light impinging on the surface of the filter is either reflected or transmitted, only negligible quantities of light being lost by absorption. A general mathematical discussion of the design of dichroic filters may be found in an article by L. Ivan Epstein entitled, "The Design of Optical Filters," page 806, Journal of the Optical Society of America, November 1952.

Generally, dichroic filters are composed of alternate strata of high refractive index and low refractive index materials superimposed one upon another upon a transparent base. The individual strata are usually a whole number of quarter wavelengths of light of a predetermined wavelength in optical thickness. The optical characteristics of the filters are determined by the refractive indices of the respective materials, the thicknesses of the individual strata, the refractive indices of the supporting base and of the material in contact with the exposed portion of a filter, and any absorption characteristics of the strata materials.

Dichroic filters may be designed particularly either to transmit or to reflect light of a predetermined band of frequencies, different specific constructions providing optimum reflection or transmission of particular spectral bands. In particular, in the case of a blue-transmitting filter for use in one type of color television pickup tube, optimum transmission characteristics may be provided by a filter comprising alternate quarter wavelength thick layers of cryolite and zinc sulfide. Slightly less satisfactory results may be provided by a filter consisting of alternate quarter wavelength layers of magnesium fluoride and zinc sulfide.

In a tricolor pickup camera tube it is often desirable to construct a dichroic filter integrally with an antimony tri-sulfide photoconductive element. The filter in a typical tricolor camera tube is constructed upon a transparent base which may be of glass. A transparent conductive metallic film and a layer of photoconductive antimony tri-sulfide are then superimposed upon the filter. This type of construction is desirable for satisfactory operation of the pickup tube in order to avoid alignment and parallax difficulties. It has been found during operation of such a tube incorporating a filter having layers of cryolite that the cryolite reacts chemically with the antimony trisulfide and destroys its uniformity by increasing its conductivity in random, localized areas. For the same reason, cryolite is also unsuitable for use in filters in contact with other photosensitive target materials such as selenium and salts of selenium and sulfur.

Filters comprising alternate quarter wavelength thick layers of magnesium fluoride and zinc sulfide are also unsatisfactory because of a pronounced tendency to "peel," i. e., they do not adhere sufficiently to the glass base. It is believed that the "peeling" is due to a lack of balance between stresses in the respective strata. Specifically, it is believed that magnesium fluoride films deposited by evaporation are under relatively great tensional stress while the zinc sulfide strata are under relatively small compressional stress. In a multi-layer filter comprising magnesium fluoride strata and zinc sulfide strata in equal thicknesses the tensional stress greatly exceeds the compressional stress and the filter is mechanically unstable.

This trouble may be avoided in filters designed to transmit other spectral bands than blue by making the zinc sulfide layers, or the equivalent high index layers which have small compressional stress, about three times as thick as the magnesium fluoride layers thus balancing the tensional against the compressional stresses. Such thickening of the zinc sulfide layers, however, cannot be utilized in the case of blue-transmitting dichroic filters without a substantial and intolerable sacrifice in transmission characteristics.

Accordingly, one object of the instant invention is to provide improved interference type light filters which are mechanically stable when deposited upon a transparent base and are compatible with photosensitive target materials.

Another object is to provide photosensitive devices having improved optical characteristics.

These and other objects are accomplished by the instant invention which provides interference filters utilizing calcium fluoride strata alternated with strata of a relatively high refractive index material. It has now been unexpectedly found that calcium fluoride may be incorporated into a multi-layer interference filter as a low index material having an index of refraction approximately equivalent to that of cryolite and that such a filter is non-reactive with photoconductive materials such as antimony trisulfide. Calcium fluoride, particularly when laid down as an evaporated film is relatively soft and stress-free. It serves to absorb and to cushion the effects of stresses which may be present in other strata of the filter.

The invention will be described in greater detail with reference to the drawing of which:

Figure 1a is a schematic, fragmentary, cross-sectional, elevational view of a photosensitive cathode ray tube target according to the invention;

Figure 1b is a table illustrating process steps for making the filter shown in Figure 1a; and Figure 2 is an elevational, cross-sectional view of a color television pickup tube incorporating a filter according to the invention.

The filter shown as part of the target structure in Figure 1 transmits primarily blue light and has a passband extending from about 4650 Angstroms to about 3700 Angstroms within which it transmits approximately 25% of the light impinging upon it. The maximum or peak transmission is about 30% between 4500 and 4100 Angstroms. Although the transmission ratio is apparently low when taken for the filter alone the photosensitivity of the target to blue light is relatively high. The effect is not clearly understood. It is believed, however, to involve an optical interaction between the filter and the layer of photosensitive material superimposed upon it. The photo effect in the target is much greater than the photosensitivity factor of the photosensitive material multiplied by the filter transmission value. Further, when the target is incorporated in a vacuum tube and subjected to conventional "bake-out" and gas evacuating processes its spectral sensitivity is shifted about 100 Angstroms toward the low frequency end of the spectrum from the position of the transmission band of the filter alone. The resulting target is characterized by a color separation and "blue sensitivity" which is close to the optimum for the blue channel in a color television camera for use in a color television system conforming to the standards adopted December 17, 1953 and released as FCC Public Notice No. 531,663, Mimeo 98948.

The filter includes an optical base 1 which may be of glass or other transparent material and which may be assumed for purposes of illustration to have an index of refraction of 1.52. The transparent optical base 1 may be the end wall of a tricolor pick-up camera tube, or may face the end wall. A surface 2 of the base bears a transparent filter composed of thirteen successively superimposed layers designated respectively by the numerals 3 through 15. The odd numbered layers 3 through 13 are of zinc sulfide and have each an effective optical thickness of 1325 Angstroms or one quarter the wavelength of green light. The even numbered layers 4 through 14, which are disposed between successive pairs of the odd numbered layers are of calcium fluoride and have each an effective optical thickness of about 1325 Angstroms, the same as the zinc sulfide layers. The thirteenth layer 15 is of gold about 150 Angstroms thick and is added to the filter to provide a conductive surface to make electrical contact to the photoconductive layer 17. Superimposed over the gold film is a layer 17 of photoconductive porous antimony trisulfide about .0002" thick. When this arrangement is used in a tricolor pick-up camera tube, the electron beam of the tube strikes the photoconductive layer 17. The antimony trisulfide is not nominally a part of the filter but does interact with it optically as heretofore explained. It is the photoconductive material the sensitivity of which the filter modifies.

It may be explained that the physical thickness of the calcium fluoride layers is about 1.75 times the physical thickness of the zinc sulfide layers. This comes about because the physical thickness of each of the layers is equal to its optical thickness divided by its refractive index, and the refractive index of calcium fluoride is smaller than that of zinc sulfide.

The successive strata, or layers of the film may be applied and their thicknesses controlled in the manner described by G. L. Dimmick in United States Patent No. 2,338,234, December 10, 1946. In the production of the filter shown in Figure 1, generally according to the method of said patent, a control light beam normal to the surface 2 and a filter having a narrow band transmission maximum at 5300 Angstroms are employed.

The successive layers are controlled in their thickness according to the values of transmission shown in Figure 1b from which it will be seen that zinc sulfide is evaporated upon the surface 2 until the light transmission reaches a minimum of about 70% of the light transmission through the untreated surface, at which point the optical thickness of the zinc sulfide is effectively one quarter the wavelength of the critical frequency (5300 Angstroms). Evaporation of zinc sulfide is then discontinued and calcium fluoride is evaporated over the zinc sulfide layer until the light transmission reaches a maximum of 85% indicating that a stratum of calcium fluoride has formed about one quarter wavelength thick. Zinc sulfide is then again evaporated according to the table of Figure 1b. Successive evaporations are carried out to deposit a total of six layers of zinc sulfide each one quarter of one wavelength in optical thickness, each two of these layers being separated by a layer of calcium fluoride, each one quarter wavelength in optical thickness. The final layer is of calcium fluoride.

The table of Figure 1b includes two sets of values. The set tabulated on the left represents actual transmission values as measured in a practical deposition process, the meter readings being adjusted to easily read values before the start of each evaporation step. The set tabulated on the right represents the same values in terms of the initial transmission of the untreated base. It will be seen that experimental accuracy is enhanced by the adjustments since the transmission is reduced to relatively small proportions of its initial value toward the end of the process.

After the final layer of calcium fluoride has been deposited gold is evaporated upon the filter to a thickness of about 150 Angstroms to provide a continuous, electrically conductive film over the surface. The thickness of the gold film is critical only insofar as its electrical conductivity may affect the operation of the subsequently deposited antimony trisulfide photoconductive layer. It has been found that a film of gold of about 100 to 150 Angstroms provides adequate conductivity.

If thicker or thinner gold films are utilized the color transmission characteristics of the filter are affected. A change in the thickness of the gold film affects primarily the rejection efficiency of the filter, i. e., it changes the ratio between the filter's maximum and minimum transmission values. It does not significantly affect the spectral limits of the transmission band.

After the gold is evaporated antimony trisulfide in porous form is deposited over the filter to complete the construction of the photosensitive cathode ray tube target. The antimony trisulfide may be deposited by any known means and may be of any desired thickness. Conveniently it may be deposited by evaporation at low pressure in an inert atmosphere such as argon at 0.6 mm. of mercury pressure. It may be, for example, about .0002" thick.

In a typical practical apparatus for evaporating interference films according to the method described, one surface (not shown) of the glass base 1 is coated with a one quarter wavelength thick of magnesium fluoride to minimize its light reflection. The base is supported in a vacuum chamber such as a bell jar and the magnesium fluoride-coated surface is covered with a protective glass sheet, the opposite surface 2 of the base being exposed toward the evaporator to receive evaporated deposits. A light beam is directed upon the base approximately normal to its surface. The light transmitted through the base is passed through a control filter having a narrow maximum transmission band at 5300 Angstroms and is measured by a photocell.

The light beam approaches the base through the protective cover glass and after passing through the base is directed through the bell jar wall to the measuring photocell. Thus, many surfaces besides the surface 2 bearing the evaporated material are traversed by the light used in measuring.

The transmission figures given in the drawing are actual experimental values as determined under practical conditions and do not represent theoretical values of transmission of the interference film alone. Actual values of transmission may vary somewhat according to the apparatus used, being affected principally by differences in the quantities of evaporated materials deposited during the process on the bell jar and the other optical surfaces of the system. The maxima and minima of the transmission, however, may be readily determined by known techniques regardless of their specific values.

Interference filters according to the invention are particularly suitable for use in color television pickup tubes such as the Vidicon tube shown in Figure 2. This tube comprises an evacuated envelope 20 with an electron gun 22 mounted at one end thereof. The electrodes of the electron gun include the usual cathode, control electrode and one or more accelerating anodes, all of which are connected to respective lead-in pins. An electron beam indicated by the dotted line 24 is directed from the gun to the composite target structure 26 at the other end of the tube. Means are provided for focussing the electron beam and for scanning the beam over the target to form a raster. Such means may include a focussing coil 28, a deflection yoke 30 and an alignment coil 32.

An electron permeable electrode 34 is positioned adjacent to the target and in operation functions together with the focussing coil to insure that the beam in its final approach to the surface of the target is normal thereto. A conductive coating 36 on the interior of the envelope is utilized as a final accelerating electrode. Spring tension fingers 40 mounted on the gun but insulated therefrom by insulating collar 41 provide an electrical connection from the coating to one of the lead-in pins.

The composite target structure 26 includes a transparent optical base 44, which may for example be glass. One side of the transparent base 44 faces the end wall 46 of the tube, while the other side faces the electron gun 22. On that side of the transparent base 44 which faces the electron gun 22 there is deposited the dichroic filter 27 consisting of alternate layers of zinc sulfide and calcium fluoride. The first layer in contact with the transparent base 44 consists of zinc sulfide. A conductive gold film 15 which serves as the signal plate is deposited on the last layer of the filter 27. A photoconductive layer 25 of antimony trisulfide is disposed on the gold film 15. Since it is very thin, the gold film 15 has not been shown as a separate layer in Figure 2, but is represented by the line between the filter layer 27 and the photoconductive antimony trisulfide layer 25. An electrical connection is made to the gold film of the filter and brought out of the envelope through a vacuum tight seal. In operation light passing through an anterior lens not shown is directed upon the composite target 26 through a glass face-plate 46 from the side of the target 26 opposite from the electron gun 22. The interference filter 27 restricts the light transmission so that only blue light is transmitted through the filter 27 to impinge upon the photosensitive antimony trisulfide layer 25. The electron beam 24 in scanning the target strikes the photoconductive layer 17 and produces a signal in accordance with the intensity of the blue light impinging on elemental areas of the photoconductive layer 25. This signal may be read as a variation in electric current through a circuit including the electron beam, the antimony trisulfide layer and the gold film.

Previous blue filters of substantially the same construction as the filter heretofore described but utilizing cryolite in place of calcium fluoride as the low refractive index material have an adverse effect on the operation of such a tube. Specifically, after about ten hours or less of operation under normal conditions the antimony trisulfide becomes non-uniform and the signal output of the tube becomes "cluttered." Pickup tubes utilizing filters according to the invention, on the other hand, have been operated under normal conditions for periods in excess of 700 hours without any significant adverse effect upon the photoconductive material.

As explained heretofore the filters of the invention have a high degree of mechanical stability and are relatively stress-free. They are therefore especially suitable for use in mosaic or segmented type filters such as filters comprising interlaced strips of alternating blue, red and green transmitting filters. In such filters the strips may be made extremely narrow such as a few thousandths of an inch in width. In such narrow strips the effects of stress coupled with the effects of electron bombardment have a relatively strong tendency to produce peeling and to detach the strips from the glass base.

The practice of the invention is not, of course, limited to the particular filter constructions heretofore described. Calcium fluoride may be utilized as a low refractive index material in interference filters generally, regardless of the thicknesses and the number of the individual strata of the filters. The refractive index of calcium fluoride in bulk form is reported in the technical literature as 1.434. It has been found, however, that when laid down as an evaporated film its refractive index closely approximates that of cryolite films deposited by evaporation which is 1.27 to 1.29.

There have thus been described improved interference filters utilizing low refractive index strata of calcium fluoride which are physically stable and compatible with photoconductive materials.

What is claimed is:

1. An interference light filter comprising a transparent base, 12 strata of dielectric materials supported upon said base each of said strata being the same whole number of quarter wavelengths of green light in effective optical thickness, and a gold film about 100 to 150 Angstroms thick superimposed upon said dielectric materials, alternate ones of said strata consisting of respectively, zinc sulfide and calcium fluoride, the stratum in contact with said base being of zinc sulfide and the stratum in contact with said gold film being of calcium fluoride.

2. A photosensitive device comprising a film of a photosensitive material superimposed upon an interference light filter, said filter comprising alternate strata of a high refractive index material and a low refractive index material, each of said strata being approximately a whole number of quarter wavelengths of green light in effective optical thickness, said low index material being calcium fluoride.

3. A photosensitive device comprising a transparent base, an interference light filter supported upon said base and a film of photosensitive antimony trisulfide superimposed upon said filter, said filter comprising a plurality of strata of dielectric materials supported upon said base and a transparent conductive film superimposed upon said dielectric materials, said strata being of alternately superimposed high refractive index material and low refractive index material, said low index material being calcium fluoride, each of said strata being approximately a whole number of quarter wavelengths of green light in effective optical thickness.

4. A photosensitive device comprising a transparent base, an interference light filter supported upon said base and a film of a photosensitive material superimposed upon said filter, said filter comprising a conductive film 100 to 150 Angstroms thick superimposed upon stratified dielectric materials, alternate strata of said dielectric materials being, respectively, of high refractive index and of low refractive index materials, said strata of low refractive index material being of calcium fluoride, and each of said strata being approximately a whole number of quarter wavelengths of green light in effective optical thickness.

5. A photosensitive device comprising a transparent base, an interference light filter supported upon said base and a film of photosensitive material superimposed upon said filter, said filter comprising a transparent gold film superimposed upon stratified dielectric materials, alternate strata of said dielectric materials being respectively of high refractive index and of low refractive index materials, said strata of low refractive index material being of calcium fluoride, and each of said strata being approximately a whole number of quarter wavelengths of green light in effective optical thickness.

6. A photosensitive device comprising a transparent base, an interference light filter supported upon said base and a film of photosensitive antimony trisulfide superimposed upon said filter, said filter comprising a gold film 100 to 150 Angstroms thick superimposed upon stratified dielectric materials, alternate strata of said dielectric materials being respectively zinc sulfide and calcium fluoride, each of said strata being approximately a whole number of quarter wavelengths of green light in effective optical thickness.

7. A photosensitive device comprising a transparent base, an interference light filter supported upon said base and a film of photosensitive antimony trisulfide superimposed upon said filter, said filter comprising a gold film about 150 Angstroms thick superimposed upon stratified dielectric materials, said stratified dielectric material including a total of 12 separate strata, each stratum being approximately one quarter wavelength of green light in effective optical thickness, alternate strata of said dielectric materials being respectively of zinc sulfide and of calcium fluoride.

8. An electron discharge tube including a photosensitive target comprising a transparent base, an interference light filter supported upon said base and a film of a photosensitive material superimposed upon said filter, said filter comprising a conductive film 100 to 150 Angstroms thick superimposed upon stratified dielectric materials, alternate strata of said dielectric materials being, respectively, of high refractive index and of low refractive index materials, said strata of low refractive index material being of calcium fluoride, each of said alternate strata being approximately a whole number of quarter wavelengths of green light in effective optical thickness.

9. An electron discharge tube including a photosensitive target comprising a transparent base, an interference light filter supported upon said base and a film of photosensitive antimony trisulfide superimposed upon said filter, said filter comprising a gold film 100 to 150 Angstroms thick superimposed upon stratified dielectric materials, alternate strata of said dielectric materials being respectively zinc sulfide and calcium fluoride, each of said strata being approximately a whole number of quarter wavelengths of green light in effective optical thickness.

10. An electron discharge tube including a photosensitive target comprising a transparent base, an interference light filter supported upon said base and a film of photosensitive antimony trisulfide superimposed upon said filter, said filter comprising a gold film about 150 Angstroms thick superimposed upon stratified dielectric materials, said stratified dielectric material including a total of 12 separate strata, each stratum being approximately one quarter wavelength of green light in effective optical thickness, alternate strata of said dielectric materials being respectively of zinc sulfide and of calcium fluoride.

References Cited in the file of this patent

UNITED STATES PATENTS

| | | | |
|---|---|---|---|
| 2,379,790 | Dimmick | July 3, | 1945 |
| 2,381,728 | Dimmick | Aug. 7, | 1945 |
| 2,392,978 | Dimmick | Jan. 15, | 1946 |
| 2,412,496 | Dimmick | Dec. 10, | 1946 |
| 2,618,700 | Weimer | Nov. 18, | 1952 |
| 2,677,714 | Auwarter | May 4, | 1954 |
| 2,700,323 | Schroder | Jan. 25, | 1955 |
| 2,742,819 | Koch | Apr. 24, | 1956 |
| 2,750,832 | Morgan | June 19, | 1956 |